(12) United States Patent
Brookfield et al.

(10) Patent No.: US 8,352,353 B1
(45) Date of Patent: Jan. 8, 2013

(54) METHOD AND SYSTEM FOR MAINTAINING TRADING ACCOUNTS

(75) Inventors: Bevan Brookfield, Evanston, IL (US); Derek Gover, Glencoe, IL (US)

(73) Assignee: RealTick LLC, Chicago, IL (US)

( * ) Notice: Subject to any disclaimer, the term of this patent is extended or adjusted under 35 U.S.C. 154(b) by 424 days.

(21) Appl. No.: 12/566,844

(22) Filed: Sep. 25, 2009

Related U.S. Application Data

(60) Provisional application No. 61/194,499, filed on Sep. 26, 2008.

(51) Int. Cl.
*G06Q 40/00* (2012.01)
(52) U.S. Cl. ............................. 705/37; 705/35; 705/36 R
(58) Field of Classification Search ................ 705/35–37
See application file for complete search history.

(56) References Cited

U.S. PATENT DOCUMENTS

| | | | | |
|---|---|---|---|---|
| 7,110,969 | B1* | 9/2006 | Bennett et al. | 705/35 |
| 7,634,440 | B2* | 12/2009 | Manstein et al. | 705/37 |
| 7,685,038 | B2* | 3/2010 | Stevens et al. | 705/35 |
| 7,890,417 | B2* | 2/2011 | Hanson et al. | 705/37 |
| 2002/0087454 | A1* | 7/2002 | Calo et al. | 705/37 |
| 2002/0156722 | A1* | 10/2002 | Greenwood | 705/37 |
| 2003/0018569 | A1* | 1/2003 | Eisenthal et al. | 705/37 |
| 2004/0236669 | A1* | 11/2004 | Horst et al. | 705/37 |
| 2005/0203825 | A1* | 9/2005 | Angle et al. | 705/37 |
| 2005/0222941 | A1* | 10/2005 | Tull | 705/37 |
| 2005/0246261 | A1* | 11/2005 | Stevens et al. | 705/37 |
| 2006/0004645 | A1* | 1/2006 | Andersson | 705/37 |
| 2007/0005481 | A1* | 1/2007 | Kedia et al. | 705/37 |
| 2007/0022053 | A1* | 1/2007 | Waserstein et al. | 705/42 |
| 2007/0250436 | A1* | 10/2007 | Mittal et al. | 705/37 |
| 2007/0271199 | A1* | 11/2007 | Kedia | 705/36 R |
| 2008/0015970 | A1* | 1/2008 | Brookfield et al. | 705/37 |
| 2008/0040237 | A1* | 2/2008 | Crussol et al. | 705/26 |
| 2008/0177637 | A1* | 7/2008 | Weiss et al. | 705/26 |
| 2008/0177645 | A1* | 7/2008 | Weiss | 705/30 |
| 2008/0177652 | A1* | 7/2008 | Weiss | 705/37 |
| 2008/0195542 | A1* | 8/2008 | Al Zarawani | 705/44 |
| 2008/0235128 | A1* | 9/2008 | Twine et al. | 705/37 |
| 2008/0249924 | A1* | 10/2008 | Chiulli et al. | 705/37 |
| 2008/0249959 | A1* | 10/2008 | Mittal et al. | 705/36 R |
| 2008/0262957 | A1* | 10/2008 | Ford | 705/37 |
| 2009/0018945 | A1* | 1/2009 | Ford | 705/37 |
| 2009/0112775 | A1* | 4/2009 | Chiulli et al. | 705/36 R |
| 2009/0292633 | A1* | 11/2009 | Crist | 705/37 |
| 2009/0313160 | A1* | 12/2009 | Kolten et al. | 705/37 |
| 2009/0327117 | A1* | 12/2009 | Lee et al. | 705/37 |
| 2010/0100472 | A1* | 4/2010 | Drumma | 705/37 |
| 2011/0119176 | A1* | 5/2011 | Hanson et al. | 705/37 |

* cited by examiner

*Primary Examiner* — Gregory Johnson
(74) *Attorney, Agent, or Firm* — Morgan Lewis & Bockius LLP

(57) ABSTRACT

Orders relating to a sale or purchase of securities are staged into an execution management system that includes a processor programmed to perform securities trading activities. Data describing the orders is stored in a database, which includes a neutral account. After the orders are staged into the execution management system, one or more of the orders, or portions thereof, are associated with one or more brokers for execution.

15 Claims, 13 Drawing Sheets

FIG. 6

IBM    121.88 → +.06        3955CM  N     16:00
Bid    121.89  Ask   122.05  Vol   8392558  Close 121.82
High   122.78  Low   121.05  Spread  .16

50,000 (50,000 Remaining)

Buy 50,000 (50,000 Remaining)

| Time  | Size | Name  | | Name  | Size | Time  |
|-------|------|-------|--|-------|------|-------|
| 17:48 | 1    | NSDQ  | | NSDQ  | 1    | 17:12 |
| 16:19 | 3    | ARCAX | | NSDQ  | 99s  | 16:50 |
| 16:18 | 2    | NSDQ  | | NSDQ  | 5    | 16:18 |
| 16:09 | 1    | ARCAX | | ARCAX | 2    | 17:48 |
| 16:00 | 3    | ISE   | | ARCAX | 1    | 17:30 |
| 16:09 | 1    | ARCAX | | NSDQ  | 2    | 17:33 |
| 17:30 | 5    | ARCAX | | ISE   | 4    | 16:00 |
| 16:40 | 2    | NSDQ  | | NSDQ  | 4    | 17:06 |
| 16:17 | 2    | NSDQ  | | ARCAX | 3    | 16:18 |
| 15:54 | 1    | NSDQ  | | NSDQ  | 3    | 16:03 |
| 15:58 | 1    | NSDQ  | | NSDQ  | 10   | 16:19 |
| 16:03 | 3    | NSDQ  | | NYLRP | 0s   | 15:59 |
| 16:15 | 9    | NSDQ  | | NSDQ  | 17   | 16:00 |

Volume       Price           Disc. Offset    Show Size
50,000       121.90   MKT                    300

Broker                                       TIF
Broker 2                                     Day Sub Account
-- Select Account --      Stop Price
                          121.90

Destination
-- Select Account --     ate    Comm/share   Conditional
Broker 2 Acct 1                  0.00
Broker 2 Acct 2

Buy    Cover    Cancel              Sell    Short

FIG. 7

| | Time | Order Details | Status |
|---|---|---|---|
| ☐ ◇ All Orders<br>◇ Broker 1<br>◈ Broker 2<br>◇ Broker 3 | 17:53 | Buy 5000 IBM at 121.97 (5000 traded @ 121.8800) | Executed |
| | 17:53 | Bought 5000 IBM at 121.88 with XASE (order 82642cdf-4d-0007) | Completed |
| | 17:53 | Buy 2300 RIMM at 82.83 (2300 traded @ 82.70000) | Executed |
| | 17:53 | Bought 2300 RIMM at 82.70 with XASE (order 82642cdf-4d-0009) | Completed |
| | 17:53 | Buy 4300 GS at 181.59 (4300 traded @ 181.4600) | Executed |
| | 17:53 | Bought 4300 GS at 181.46 with XASE (order 82642cdf-4d-000a) | Completed |

FIG. 8

| List Creation Manager *all asset classes.csv | | | | | | | | |
|---|---|---|---|---|---|---|---|---|
| Ticket List Tag: | multibroker | | ☑ Upper Case Symbols | | ☐ Claim Required | | List Trading Preferences... | |
| Side | Quantity | Symbol | | Price Type | Limit Price | Route | Notes | Portfo |
| Buy | 10,000 | COH | | Market | | NONE | | |
| Buy | 20,000 | AMZN | | Market | | NONE | | |
| Sell | 5,000 | AMZN | | Market | | NONE | | |
| Sell Short | 10,000 | BBBY | | Market | | NONE | | |
| Buy | 20,000 | VOD.LSE | | Market | | NONE | | |
| Sell | 10,000 | BBVA.MAD | | Market | | NONE | | |
| Sell | 10,000 | /FEU3DC07.EUX | | Market | | NONE | | |

OK
Cancel

Delete
Delete All

Load Tickets...
Save Tickets...

Help

FIG. 9

Edit List Trading Parameters

| Child Firm | All Firms ▷ |
|---|---|
| ☐ Child Account | All Firms |
| | Broker 1 |
| | Broker 2 |
| | Broker 3 |
| ☐ Quantity | Broker 4 |
| ☐ Route | |
| ☐ Price Type | |
| Offset | ◁▷ |
| ☐ Disc Offset | |
| ☐ Peg Order | |
| ☑ Time in Force | ▷ |
| ☑ Volume Type | ▷ |
| ☐ Show Size | ◁▷ |
| ☑ Notes | |

[Set Values] [Cancel] [Help] [⋮]

[Execute Now]

Edit List Trading Parameters

| Child Firm | Broker 2 ▷ |
|---|---|
| ☑ Child Account | Account 1 ▷ |
| ☑ Quantity | % of Target ▷ 10 ◁▷ |
| ☑ Route | DEMO ▷ |
| ☑ Price Type | LMT ▷ |
| Delta (+/-) | bid ▷ -.01 ◁▷ |
| ☐ Disc Offset | |
| ☐ Peg Order | ◁▷ |
| ☑ Time in Force | Day ▷ |
| ☑ Volume Type | Partial ▷ |
| ☐ Show Size | ◁▷ |
| ☑ Notes | |

[Set Values] [Cancel] [Help] [⋮]

[Execute Now]

FIG. 10B

| CHILD FIRM | CHILD ACCOUNT | % |
|---|---|---|
| ALL FIRMS | ACCT 1 | |
| BROKER 1 | ACCT 2 | |
| BROKER 2 | ACCT 3 | |
| BROKER 3 | | |
| BROKER 4 | | |

FIG. 11

Edit List Trading Action

Name [10% to TEST]  ☐ Auto

Affects [Selected ▽]

☐ Cancel existing child orders

☑ E*x*ecute

Child Firm [Broker 2 ▷]

☑ Child *A*ccount [Account 1 ▷]

☑ *Q*uantity [% of Target ◁▷] [10]

☑ *R*oute [Test ▷] [db2 ⋮]

☑ *P*rice Type [Mkt ▷]

Offset [ ◁▷]

☐ *D*isc Offset [ ◁▷]

☐ *P*eg Order [ ▷]

☐ *T*ime in Force [ ▷]

☐ *V*olume Type [ ▷]

☐ Show Size [ ◁▷]

☐ *N*otes [ ]

[OK]
[Cancel]
[Help]

FIG. 12

METHOD AND SYSTEM FOR MAINTAINING TRADING ACCOUNTS

This application claims the benefit of the U.S. Provisional Patent Application No. 61/194,499 filed on Sep. 26, 2008, which is hereby incorporated by reference.

FIELD OF THE INVENTION

The present invention relates to maintaining accounts for trading securities.

BACKGROUND

In a typical execution management system ("EMS"), multiple users to have access to a single account. This provides, for example, supervisory functions for administrators over traders and their account activity. Also, it is very common for a buy-side or hedge fund to trade with a particular broker, and for that broker to have full access to the trader's account. In a multiple broker environment, staged order volume would be exposed to all brokers that had administrative rights to the account regardless of which broker the trader intended to trade with. Also, once the trader routes flow to a broker, the administrator would be able to see with whom that trade executed. Institutional trading customers have a need to trade with multiple brokers. There are a number of reasons for this, for example, soft-dollar arrangements where order flow is used as payment for research and avoiding disclosing trading strategies to a single broker.

Institutional portfolio/fund managers use an Order Management Systems ("OMS") to keep track of the securities they need to buy or sell on a given day. Traditionally, the decision of which broker to send all or part of an order to has been made at the OMS level. The traders who are responsible for buying or selling the securities specified by the fund manager often use a separate EMS to actually send trades to the markets. The EMS allows traders to have more fine-grained control over their executions, and they can monitor real-time financial data and trade smaller portions of large orders without impacting the market price. An EMS is traditionally associated with a particular broker.

SUMMARY OF THE INVENTION

The present invention is directed to a system, method and computer product. Orders relating to a sale or purchase of securities are staged into an execution management system, which includes a processor programmed to perform securities trading activities. Data describing the orders is stored in a database, which includes a neutral account. After the orders are staged into the execution management system, one or more of the orders, or portions thereof, are associated with one or more brokers for execution.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 6, 7, 8, 9, 10A, 10B, 11 and 12 are exemplary user interfaces that may be used to carry out certain functionality of the present invention.

DETAILED DESCRIPTION OF THE INVENTION

Figure 1:
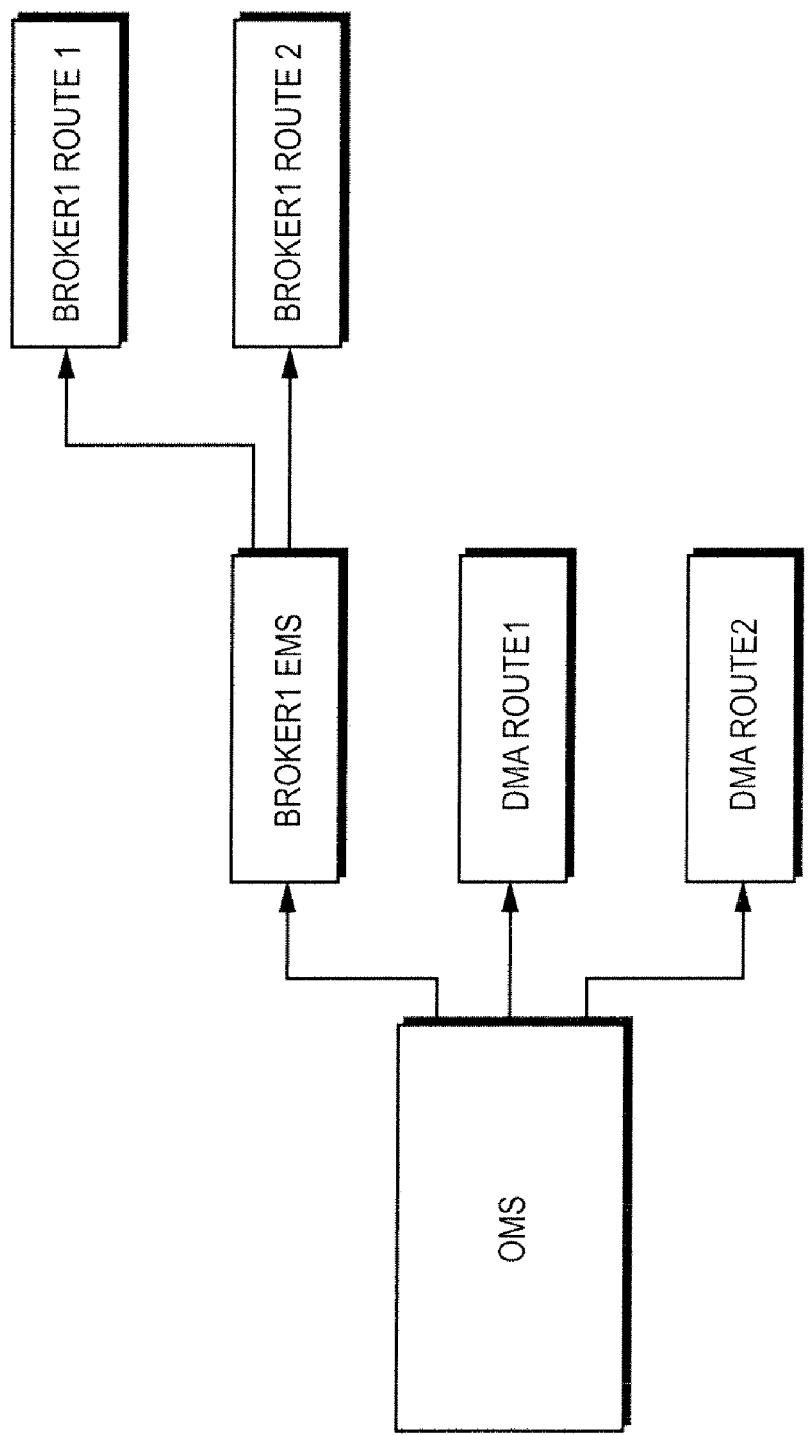
FIGS. 1-4 illustrate exemplary models for placing and trading orders using an OMS and an EMS.

Reference will now be made in detail to the embodiments of the present invention, examples of which are illustrated in the accompanying drawings. Wherever possible, like reference numbers will be used for like elements.

To prevent a situation where administrators from one broker/dealer ("B/D") can see flow routed to other B/Ds, a neutral account is created and used in accordance with the systems and methods described herein. The neutral account is an account in or maintained in connection with an EMS that is not associated with any particular broker, but is related to two or more broker accounts. Using the neutral account, a buy-side trader can create an order in a broker-neutral environment, then route shares to a particular broker for execution. This maintains a high level of administration for the brokers, but also allows the trader to expose order flow only to the brokers the trader decides to route to. Using the neutral account, anonymity is achieved—each broker only sees activity in the accounts with which it is associated (e.g., executing broker only sees the trades sent to it, and not those sent to other brokers). Only the trader sees the full activity in the neutral account.

Furthermore, the system and method described herein provide the ability to defer a decision as to which broker to trade with until after an order is staged into the OMS. The neutral account described herein allows an EMS to have a staging account where orders, e.g., large orders, can be placed, either directly or via an OMS, without being associated with a particular executing broker until the trader decides to send all or part of the order to the market, at which time the executing broker is specified.

Orders in the neutral account may be copied into individual broker accounts. In particular, when an order is placed in a neutral account, the trader may specify the executing broker as well as the execution venue. The system will then place an identical copy of the order in the specified broker account, and link the two orders. The order in the broker account is the one that will be routed out to the desired execution venue. Any fills on the order in the broker account will be echoed back to the order in the neutral account. If the order is cancelled by the execution venue, the order in the neutral account will also be cancelled, etc. Positions and other trading statistics can be easily viewed at the aggregate level or at the broker level, because each order placed exists in both the neutral account and a broker account.

Preservation of a rich account structure is accomplished by way of the neutral account, which provides a number of advantages, including the following. Certain of these advantages involve maintaining control over the account. For example, individual B/Ds can more precisely control what each account can do, e.g., restrict shares size, dollar amount. Also, one B/D's settings do not impact that of another B/D. Brokers can also entitle accounts separately (i.e., regions and asset classes that can be traded with that B/D). Furthermore, transparency is achieved. In particular, the B/D has transparency into what its client are doing; it can trade on behalf of the customer, etc. However, anonymity across brokers is still preserved. Furthermore, the account structure of the neutral account can more closely match the customer's account structure at other institutions (such as its prime brokerage account). Finally, account details (i.e. positions, funds) from each prime broker can be loaded and tracked separately in the EMS.

The neutral account has particular applicability to systems that have the ability to function in multiple ways, e.g., some end users using the system purely as an EMS, and others using the system more as an execution and position management system. Thus, for some end users, the account would have just been with the executing broker, and the shares would be allocated at the end of day to the prime broker somewhere else. For other end users, the custodial accounts would be part of the system, which means that the customer could essentially perform pre-trade allocations by just choosing which account to trade in. This would remove some of the need for post-trade allocations. For other end users that use a pure EMS, a single omnibus execution account can be used, and allocation can be performed at the end of the day to the appropriate prime broker accounts. However, this is a limitation because such systems do not allow the trader to see the account breakdown by fund, because there is only one account (i.e., the omnibus account)—such limitation is accounted for through use of the neutral account described herein.

The following provides an overview of an OMS and EMS, and how the methods and systems described herein may be used in connection with the same. In general, a customer uses an OMS to manage the life-cycle of an order, manage portfolio positions and P&L, etc. The OMS connects directly to various execution venues, typically via the standard FIX protocol. For simple types of trades, trader can use direct OMS connections. For more complicated trades, trader can send the order to an EMS. This is referred to as "staging an order" into an EMS. An EMS typically gives the trader more control over how an order is executed. An EMS allows trader to see real-time market data, including the depth of the market. There is overlap between OMSs and EMSs, but the EMS deals more with the detail of orders, and the OMS with high level information regarding orders.

FIG. 1 shows the various routes through which an OMS can trade, either directly with a venue, using a Direct Market Access ("DMA") route, or via an EMS using a broker.

Figure 2:
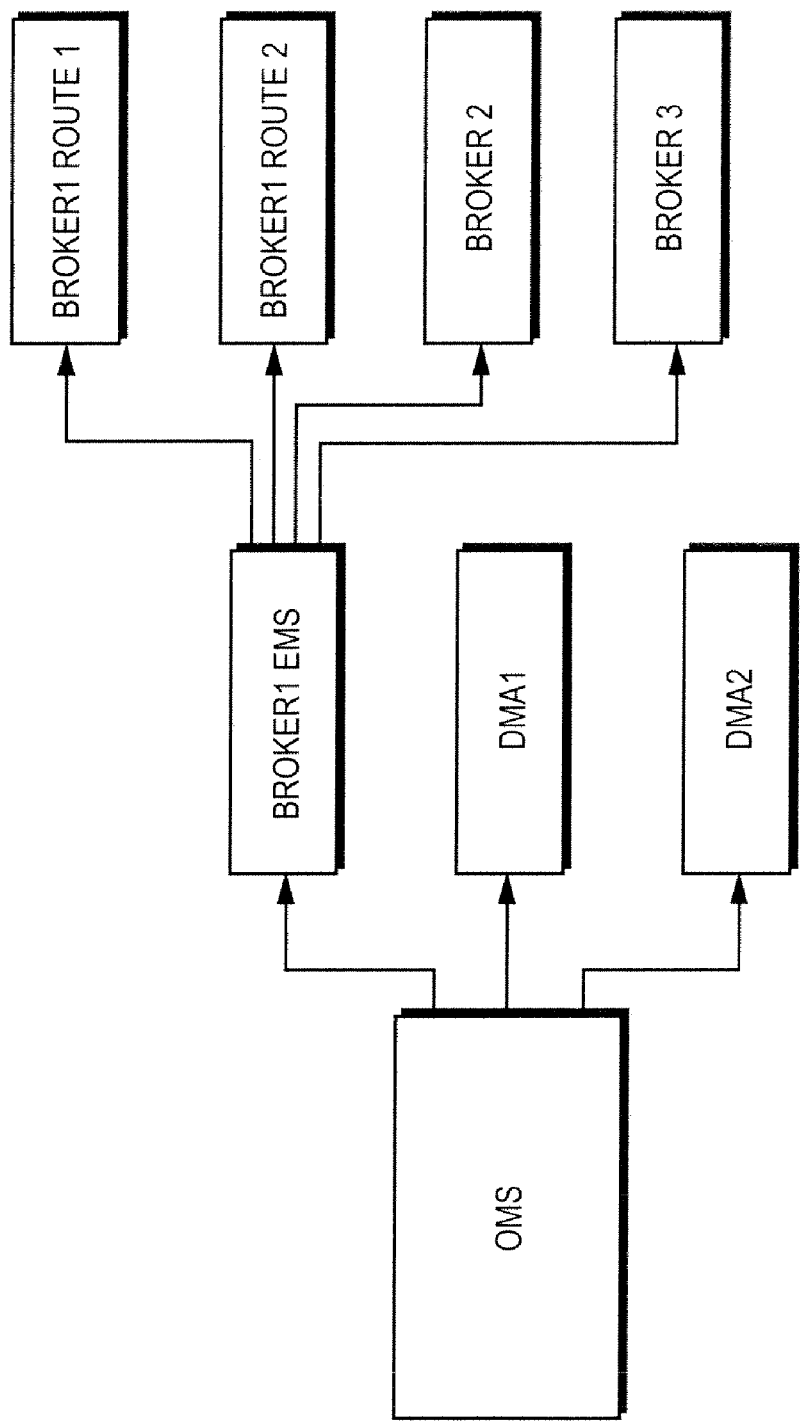

FIG. 2 illustrates indirect multi-broking. As shown in FIG. 1, an OMS may have its own DMA routes. In addition, the primary broker (Broker 1) associated with the EMS has relationships with other brokers (Brokers 2 and 3), referred to as sponsored access. In this model, the primary broker is aware of trading activity with the other brokers that the EMS connects to.

Figure 3:
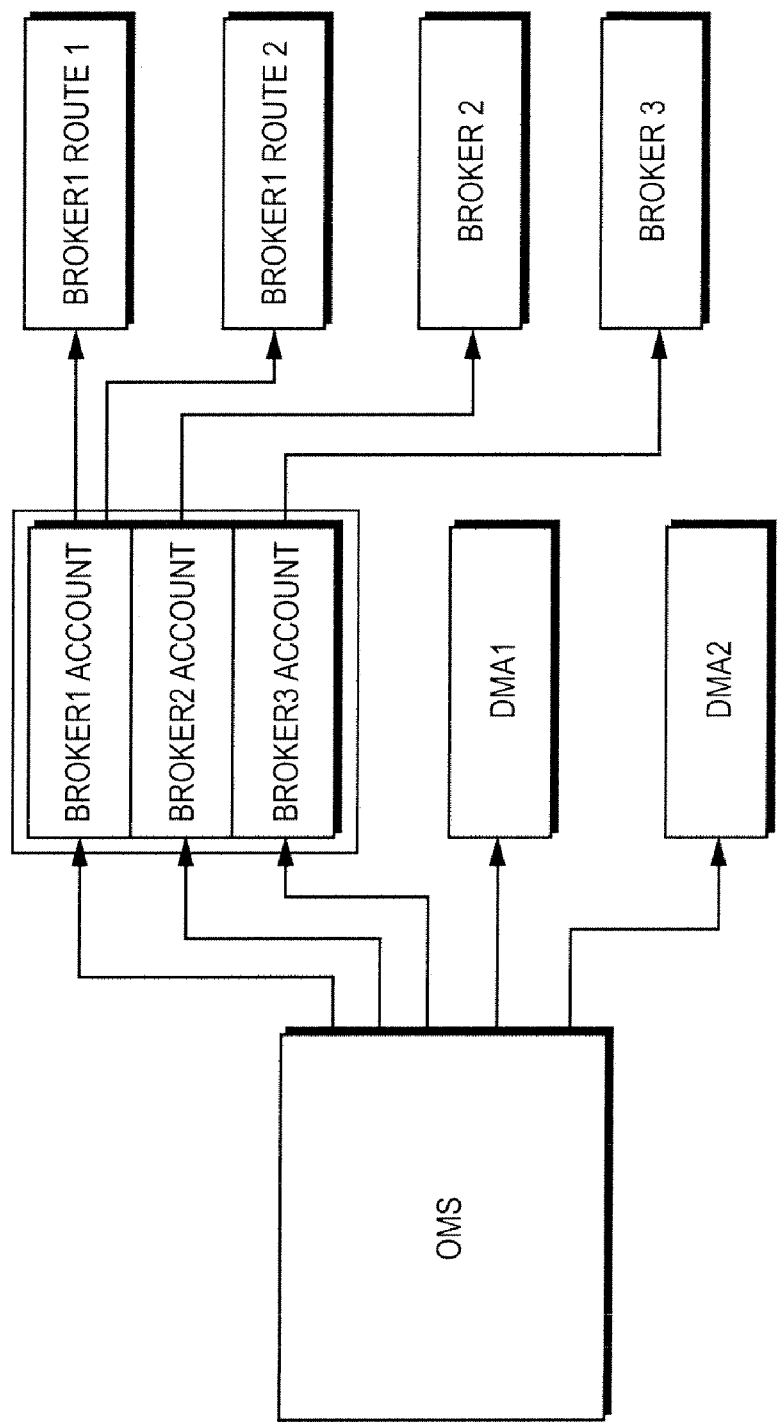

FIG. 3 illustrates a scenario where the OMS has direct connectivity to multiple brokers, in addition to its own DMA routes. Each broker (i.e., Brokers 1, 2 and 3) can only see trades in its accounts. Thus, when staging an order from the OMS, the trader must choose beforehand which broker he/she wants to trade with.

Figure 4:
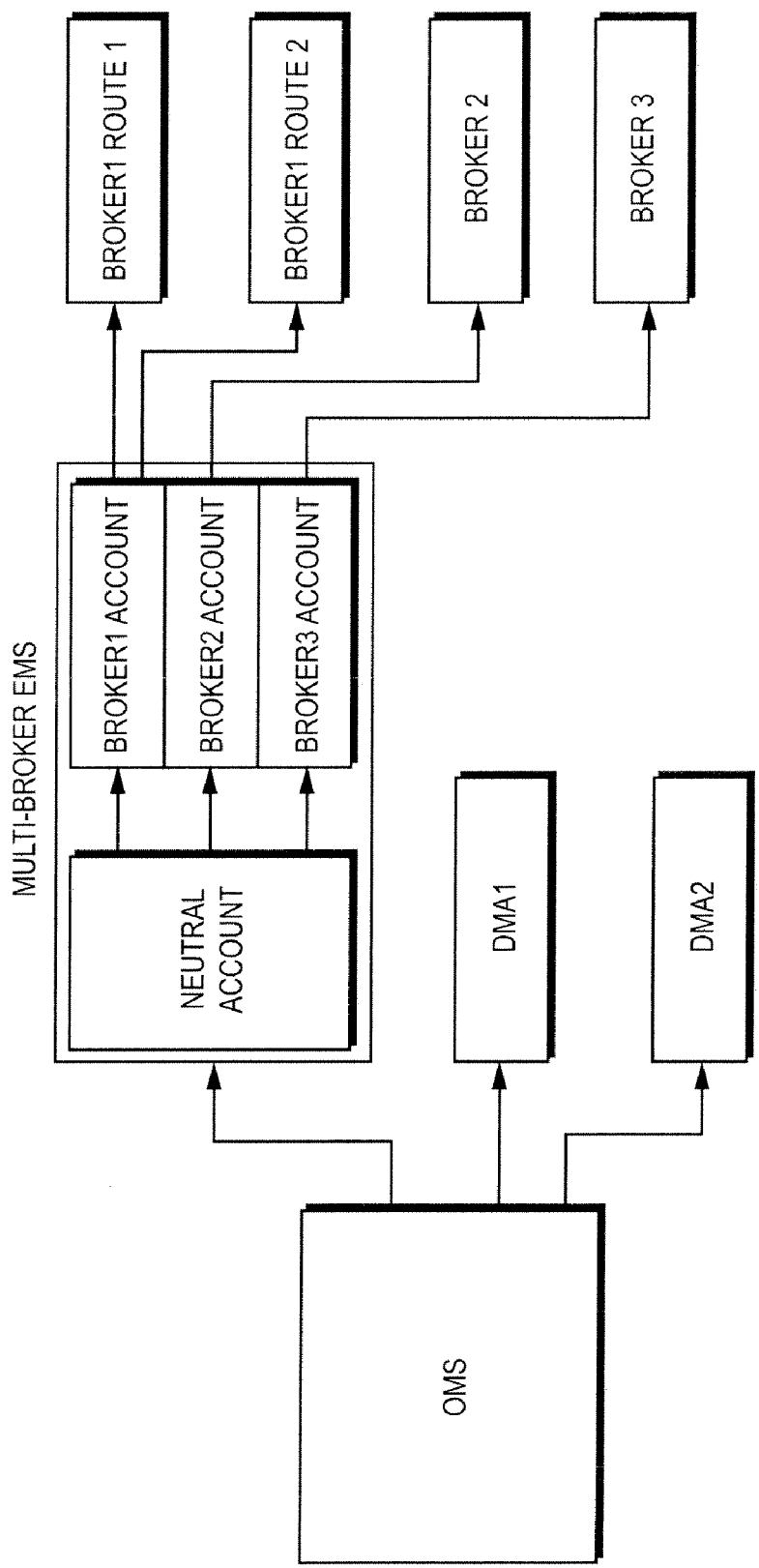

FIG. 4 shows the full neutral account model, illustrating sub-routing with a neutral account on top of segregated broker accounts. The order is staged into the neutral account and, from there, trader can choose which broker to trade with, and which of the broker's routes to use.

Figure 5:
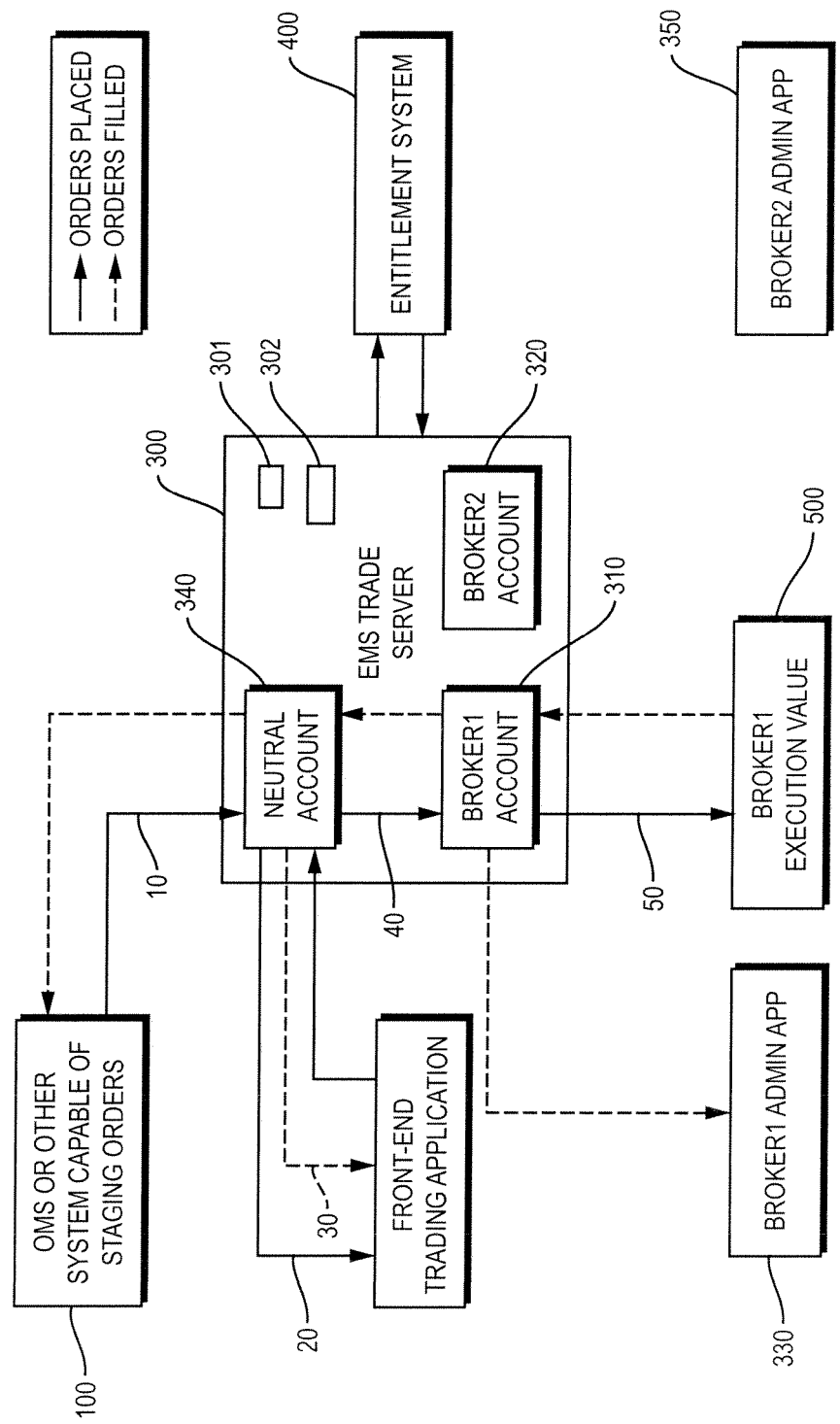
FIG. 5 illustrates an exemplary system used to carry out the embodiments of the present invention, and an exemplary manner in which communications between such system components occur.

Certain components of an exemplary embodiment of a system that may be used to carry out the processes discussed herein are described with reference to FIG. 5. An OMS 100 or other similar system is used to stage orders with an EMS, e.g., trade server system 300. In other embodiments, an OMS is not used and orders are placed directly with the EMS/trade server system 300. A neutral account 340 is created and maintained in connection with trade server system 300. In step 10, an order is staged into neutral account 340 by OMS 100. Neutral account 340 is not associated with a particular B/D firm. This results in transparency for brokers for the part of the orders are sent to them, but anonymity for the parts of the orders that were not sent to them.

Trade server system 300 may be comprised of a single server, or may comprise a system of multiple, connected servers, each performing certain tasks, for scalability. Trade server system 300 may be used to perform various functions, including one or more of the following functions: accepting orders, and sending them to various execution venues 500, and returning status/execution information about them; supporting the concept of staged orders; disseminating information about orders and positions for accounts, and responding to queries about them; and guaranteeing that only permissioned users can see trades/positions for a given account. An entitlement system 400 may be employed by trade server system 300 to determine which applications (users) are entitled to see which accounts (i.e., orders and their fills). Trade server system 300 also supports the cloning, or copy, of an order in neutral account 340, where the clone is resubmitted into a broker account 310. Information about the order is also reflected in the broker admin application 330.

A front end trading application 200 is used to execute trades. In step 20, the front end trading application 200 is notified of the staged order. In step 30, the order is placed in the neutral account 340 by the front end trading application 200 to fulfill the staged order, trading with Broker 1 in this example. The trade server system 300 detects an order in a neutral account 340, creates a clone of it in a broker account 310 for Broker 1, in step 40, and ties those two orders together by way of, e.g., relating such records in a relational database, so that fills from the broker account are reported back to the neutral order, and cancels from either end are transferred to the other.

An EMS application, running on trade server system 300, is used to generate orders and show order history and position information.

Part of the functionality of the trade server system 300 is to receive actions from the user and translate them into events at the execution venue 500, and then report back events from the venue 500. Examples of user-initiated actions are Place Order, Change Order, and Cancel Order. Examples of actions from the execution venue 500 include Order Placement Acknowledgement, Change Acknowledgement, Executions, and Cancellations. Cancellations can come from the execution venue either as a result of a user-initiated action, or unsolicited (i.e. order's time-in-force has expired). User-initiated actions are typically in a Pending state until confirmed/approved/acted upon by the execution venue.

In the embodiments in which the neutral account 340 is employed, a clone/copy of the original order is created, and then passed on to the execution venue 500, in step 50. Events are passed back from the execution venue back to the original neutral order:

Neutral Order<==>Broker Order<==>Order at Execution Venue

The following examples show how the state between the neutral order, the cloned broker order, and the order at the execution venue 500 are managed.

Submit an Order:

When an order is placed in a neutral account 340, the trade server system 300 creates a clone of the order and attempts to place it in the specified broker account, e.g., broker account 310. The original order is in a Pending state until the state of the cloned order is confirmed.

When the trade server system 300 receives the broker order, it sends an order to the designated execution venue 500. The broker order is pending until the state of the order at the execution venue is confirmed.

The execution venue can either accept or reject the order.
 If it accepts the order, then the broker order's state becomes Live.
 If not, the broker order becomes Deleted.

When the trade server system 300 detects the new state of the broker order, the neutral order is updated to the same state.

Change an Order:

When a user tries to change a neutral order, this causes a clone of the change request to be placed in the specified broker account, e.g., broker account 310. The original change request is in a Pending state until the state of the cloned change request is confirmed.

When the trade server system 300 receives the cancel request for the cloned order, it sends a change request to the execution venue 500. The broker order is pending until the state of the change request at the execution venue 500 is confirmed.

The execution venue 500 can either accept or reject the change request.
 If it accepts the change, then the change request's state in the broker account is Completed, and the broker order is changed as desired.
 If it rejects the change, the change request's state in the broker account is Deleted.

When the trade server system 300 detects the new state of the change request and order in the broker account 310, the neutral change request and order are updated to the same state.

The flow of events for a request to Cancel an order is essentially the same as the case for Change requests described above.

OMS 100 is comprised of one or more servers including one or more processors specially programmed to perform order management functions described herein, including staging orders to the EMS. OMS 100 may also include one or more databases that store data relating to the order.

Front end trading application 200 is accessed by or run on a client computer that is used by a trader in connection with an EMS to place trades. Front end trading application may be maintained on trade server system 300 or accesses trade server system 300 over a computer network, such as a LAN or WAN.

Broker administrative application 330, 350 is accessed by or run on a client computer that is used by a broker in connection with an EMS to execute trades. Broker administrative application 330, 350 may be maintained on trade server system 300, or accesses trade server system 300 over a computer network, such as a LAN or WAN.

Entitlement system 400 is comprised of one or more servers, including one or more processors specially programmed to perform entitlement functions described herein. Entitlement system 400 may also include one or more databases that store entitlement data.

One embodiment of trade server system 300 includes memory 301, e.g., one or more nonvolatile storage devices, for storing data and/or executable software code to perform the functionality of an EMS described herein. One or more machines or processors 302 that make up trade server system 300 are specially programmed to perform the functions carried out by trade server system 300 described in detail herein, including cloning of orders to broker accounts, controlling access to data etc. The memory 301 may include RAM or a hard drive or other types of memory that are known to one of ordinary skill in the art.

Neutral account 340 and broker accounts 310 and 320 comprise data stored in one or more databases stored on or in communication with, e.g., trade server system 300. In one embodiment, the system includes at least two databases—one of which stores event (e.g., trade) information and the other of which stores account information (e.g., customer data) associated with such events. Trade server system 300 extracts, processes, analyzes, and stores the data comprising neutral account 340, and broker accounts 310 and 320, in such databases.

FIGS. 6, 7, 8, 9, 10A, 10B, 11, and 12 show exemplary interfaces of front end trading application 200 (of FIG. 5) that can be used in connection with the present invention. As discussed previously, the embodiment of the platform described herein is a multi-broker platform that allows for integrating functionality for multi-broker clients with the EMS. The multi-broker offering is enhanced through use of neutral trading accounts. The neutral trading account allows a user to seamlessly trade to his/her various brokers' accounts. Previously, if a user wanted to send orders to multiple brokers, the user would have to choose a specific broker account on each order. With the system described herein, a user can enter orders into a neutral account and subsequently route all or portions of each order to their desired broker(s). A user can also route staged orders from an OMS to the EMS and work the orders in the neutral account.

Figure 6:
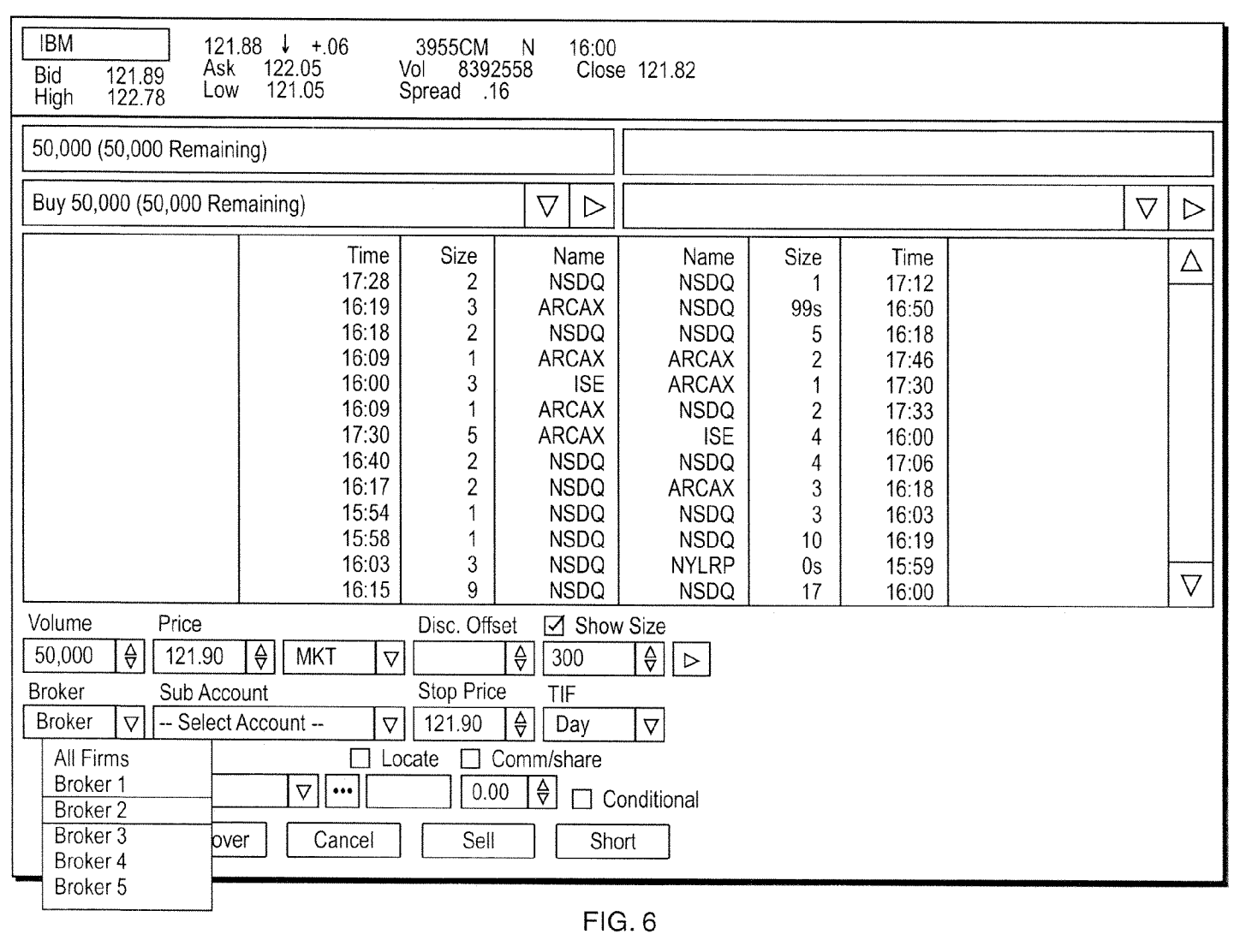

FIGS. 6 and 7 show an exemplary interface illustrating the manner in which the neutral account can be used to execute single orders. In particular, once a neutral account has been created for a user, the user can trade single orders. The user associates the window with the neutral account, and then picks the broker, broker account and destination through a series of drop down menus. As shown in FIG. 6, the broker is chosen and, with reference to FIG. 7, a broker account is chosen.

Once the orders have been sent to the broker destinations, a user can view an aggregate order or position summary by associating the neutral account with the order tracker or position tracker, as shown in FIG. 8. As illustrated in FIG. 8, the trader can see all positions with all brokers. Brokers can only see order flow routed to them.

As discussed above, the neutral account of the present invention can be used with staged orders. In particular, a user can send multiple orders in a list to multiple brokers through the neutral account that originated from an OMS or from an EMS. A new order is opened. With reference to FIG. 9, a user can either import a list of symbols from a .csv or .txt file, or add symbols through on-screen editing of the list creation manager. Accounts associated with a particular order can be referenced in the "Portfolio" column FIG. 9.

With reference to FIGS. 10A, 10B and 11, once the staged orders have been created, a user can configure the Broker, Child Account and Route through the Order Settings dialog or on-screen editing of the Child Parameter fields in the order tracker.

With reference to FIG. 12, a user can also create Order Actions in Actions Manager section of Order Entry properties so that the EMS will route orders with a click of a button to their preferred broker based on user defined parameters.

Figure 13:
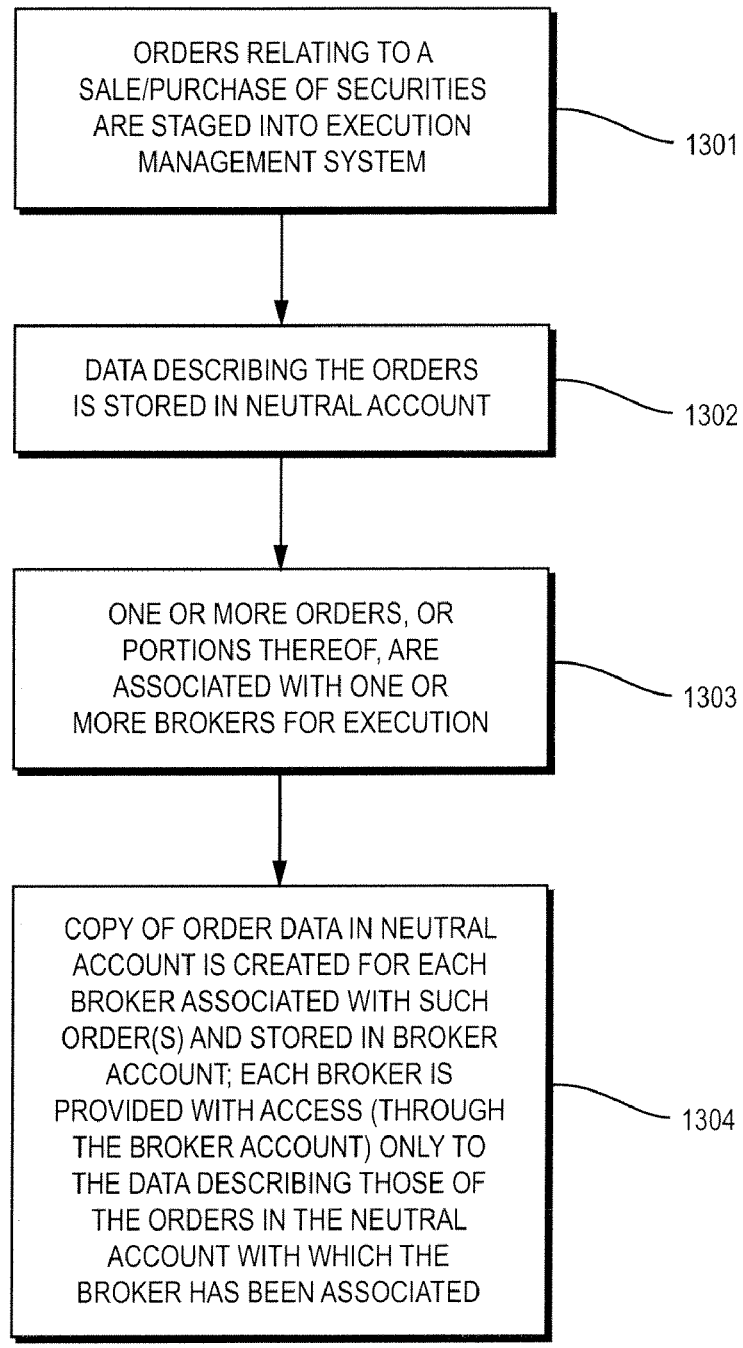
FIG. 13 is a flow diagram illustrating an exemplary method of the present invention.

With reference to FIG. 13, a flow diagram is shown, illustrating an exemplary method of the present invention. In step 1301, orders relating to a sale/purchase of securities are staged into an execution management system. In step 1302, data describing the orders is stored in a neutral account. In step 1303, one or more orders, or portions thereof, are associated with one or more brokers for execution. In step 1304, a copy of data describing the order(s) associated with each of the brokers is stored in that broker's account; each broker is provided with access (through the broker's account) only to the data describing those of the orders in the neutral account with which the broker has been associated.

It will be apparent to those skilled in the art that various modifications and variations can be made in the a system and method for school district improvement of the present invention without departing form the spirit or scope of the invention. Thus, it is intended that the present invention cover the modifications and variations of this invention provided they come within the scope of the appended claims and their equivalents.

What is claimed is:

1. A computer-implemented method comprising:
    staging one or more orders relating to a sale or purchase of securities into an execution management system, the execution management system comprising a processor programmed to associate at least a portion of at least one order with one of a plurality of brokers for execution after the order is staged into the execution management system; and
    storing data describing the one or more orders in a database comprising a neutral account, wherein the execution management system and the neutral account are configured to prevent each broker from seeing trading activity of remaining brokers associated with the neutral account.

2. The computer-implemented method of claim 1, the execution management system further comprising a processor programmed to associate one of (i) at least another portion of the at least one order and (ii) at least a portion of another order with one of the plurality of brokers for execution.

3. The computer-implemented method of claim 1 wherein the orders are staged using an order management system, the order management system comprising a processor programmed to stage securities for purchase or sale.

4. The computer-implemented method of claim 1 further comprising:
    creating a copy of at least certain data describing the portion; and
    storing the copy in a broker account of the broker with which the portion has been associated.

5. The computer-implemented method of claim 4 further comprising:
    providing the broker with which the portion has been associated with access only to the copy in the broker account.

6. A system comprising:
    an execution management system configured to accept data describing one or more orders relating to a sale or purchase of securities staged into the execution management system, the execution management system comprising a processor programmed to associate at least a portion of at least one order with one of a plurality of brokers for execution after the order is staged into the execution management system; and
    a database configured to store data describing the one or more orders, the database comprising a neutral account, wherein the execution management system and the neutral account are configured to prevent each broker from seeing trading activity of remaining brokers associated with the neutral account.

7. The system of claim 6 further comprising a processor programmed to associate one of (i) at least another portion of the at least one order and (ii) at least a portion of another order with one of the plurality of brokers for execution.

8. The system of claim 6 further comprising:
    an order management system comprising a processor programmed to stage securities for purchase or sale.

9. The system of claim 6 further comprising:
    a broker account of the broker with which the portion has been associated configured to store a copy of at least certain data describing the portion.

10. The system of claim 9 wherein the broker account is further configured to provide the broker with which the portion has been associated with access only to the copy in the broker.

11. A computer program product including a computer readable medium having stored thereon computer executable instructions that, when executed by a computer, direct the computer to perform a method comprising the steps of:
    receiving one or more orders relating to a sale or purchase of securities for staging into an execution management system;
    storing data describing the one or more orders in a database comprising a neutral account, wherein the execution management system and the neutral account are configured to prevent each broker from seeing trading activity of remaining brokers associated with the neutral account; and
    associating at least a portion of at least one order with one of a plurality of brokers for execution after the order is staged into the execution management system.

12. The computer program product of claim 11 the method further comprising: associating one of (i) at least another portion of the at least one order and (ii) at least a portion of another order with one of the plurality of brokers for execution.

13. The computer program product of claim 11, wherein the orders are staged using an order management system.

14. The computer program product of claim 11 the method further comprising: creating a copy of at least certain data describing the portion; and storing the copy in a broker account of the broker with which the portion has been associated.

15. The computer program product of claim 14 the method further comprising: providing the broker with which the portion has been associated with access only to the copy in the broker account.

* * * * *